United States Patent [19]
von Allmen et al.

[11] Patent Number: 5,707,181
[45] Date of Patent: Jan. 13, 1998

[54] METHOD OF PRODUCING AN INTENDED BREAKING POINT IN A TENSION MEMBER FOR A SOIL ANCHOR

[75] Inventors: Hans-Peter von Allmen, Bäretswil, Switzerland; Reinhard Klöckner, Munich; Erich Richartz, Gräfelfing, both of Germany

[73] Assignee: Dyckerhoff & Widmann Aktiengesellschaft, Munich, Germany

[21] Appl. No.: 582,452

[22] Filed: Jan. 3, 1996

[30] Foreign Application Priority Data

Jan. 4, 1995 [DE] Germany ............... 195 00 091.9

[51] Int. Cl.⁶ .................................... E02D 29/02
[52] U.S. Cl. .................. 405/262; 148/639; 148/595; 225/2; 225/96.5; 405/259.5; 411/5
[58] Field of Search ............... 405/262, 254.1; 411/1-5, 10, 15; 148/639, 595; 225/2, 93.5, 94.5, 93

[56] References Cited

U.S. PATENT DOCUMENTS

| Re. 33,901 | 4/1992 | Shinjo | 411/5 X |
|---|---|---|---|
| 1,209,250 | 12/1916 | Bellanger | 225/2 |
| 2,298,528 | 10/1942 | De Causse | 225/2 X |
| 3,406,886 | 10/1968 | Wesel et al. | 225/2 |
| 3,541,798 | 11/1970 | Schnabel | 405/262 |
| 3,958,732 | 5/1976 | Aoyama et al. | 148/595 X |
| 4,486,240 | 12/1984 | Sciaky | 148/639 X |
| 4,971,493 | 11/1990 | Herbst et al. | 411/5 |
| 5,407,303 | 4/1995 | Manns | 405/262 |

FOREIGN PATENT DOCUMENTS

| 2274740 | 1/1976 | France . | |
|---|---|---|---|
| 671057 | 7/1979 | Switzerland . | |
| 681835 | 5/1993 | Switzerland . | |
| 882462 | 11/1961 | United Kingdom | 148/639 |
| 1100929 | 1/1968 | United Kingdom | 148/639 |

Primary Examiner—Dennis L. Taylor
Attorney, Agent, or Firm—Friedrich Kueffner

[57] ABSTRACT

A method of producing an intended breaking point at a predetermined location of a tension member for a soil anchor of a strain-hardened steel or a steel which is not which is not in a thermodynamic equilibrium, for example, a wire or a steel wire strand, to enable removal of the free steel length after use by applying a tensile force which exceeds the working load. The predetermined breaking point is obtained by heating the tension member at a predetermined location in a controlled manner to a temperature at which the state of strain-hardening or the state of being not in a thermodynamic equilibrium is at least partially cancelled, wherein the predetermined breaking point has a breaking load which is equal to or smaller than the breaking load of the untreated tension member, but greater than the yield point of the untreated tension member.

19 Claims, 1 Drawing Sheet

1

METHOD OF PRODUCING AN INTENDED BREAKING POINT IN A TENSION MEMBER FOR A SOIL ANCHOR

BACKGROUND OF THE INVENTION

1. Field of the Invention

The present invention relates to a method of producing an intended breaking point at a predetermined location of a tension member for a soil anchor of a strain-hardened steel or a steel which is not which is not in a thermodynamic equilibrium, for example, a wire or a steel wire strand, to enable removal of the free steel length after use by applying a tensile force which exceeds the working load.

2. Description of the Related Art

A soil anchor is composed of a tension member having one or more steel rods, steel wires or steel wire strands. The tension member is inserted into a bore hole and a bonding action is obtained with the bore hole wall and, thus, with the surrounding soil, by pressing hardening material, such as, cement mortar or the like, into the depth of the bore hole. A pressing member produced in this manner is connected in a frictionally engaging manner with the structural component to be anchored through the remaining part of the tension member which extends within a tubular sheathing and is freely extendable. The length of the tension member over which the tension member is embedded in the pressing body is called the anchoring length, and the remaining length of the tension member, which for the purposes of prestressing is freely extendable, is called the free steel length.

Soil anchors may be used for the permanent anchoring of structures in the soil. However, they can also be used temporarily, such as, for the rearward anchoring of a wall in an excavation. If a temporarily mounted soil anchor extends into a neighboring piece of land, it must usually be removed after the construction work during which it was employed has ended.

For removing a soil anchor, a possibility for severing the tension member is usually provided at the transition between the anchoring length and the free steel length of the tension member, so that the free part of the tension member can be pulled out of the bore hole and possibly recovered. The pressing body itself, which rarely has a length greater than about 4 to 8 meters, remains in the ground. However, also known in the art are temporary anchors which can be removed over the entire length thereof. In these temporary anchors, the force is transmitted at the lower end of the tension member to an anchoring element and the force is introduced from this anchoring element through pressure into the pressing body.

Several possibilities exist for severing the tension member of a soil anchor at a predetermined location. However, only two of these possibilities are used in actual practice. In the first case, the tension member is weakened at the location in question already prior to mounting in order to provide a predetermined breaking point. In the second case, the tension member is provided prior to mounting with a device at the intended point of severing, wherein the device is capable of weakening the tension member after mounting and use of the tension member. In both cases, an excess load is applied on the tension member for severing and removing the free length of the tension member.

The tension member is weakened prior to mounting by mechanically reducing the cross-sectional area of the steel, for example, by making a notch. By applying a certain tensile force, i.e., the breaking force, the tension member breaks at the weakened point. When this method is used, there is the danger that the notch effect causes the anchor to fail when increased external loads are applied without marked elongation behavior and thus, without warning. In order to take this into consideration, when dimensioning the tension member, increased safety coefficients are required which lead to an overdimensioning of the soil anchor. The capability of utilizing the steel is further diminished because of the dispersion of the breaking force which is difficult to control because of the method used, without being able to compensate for the deficiency of the non-existent ductility.

In addition, it is known from CH 671 057 A5, in a tension member composed of steel wire strands, to produce an intended breaking point by completely severing the central wire and possibly also external wires at the predetermined location and again connecting the wires by means of a pressure sleeve. By applying the breaking force, the pressure sleeve and the remaining outer wires fail, so that the free steel length of the tension member can be removed. The relative position of the severing point of the wires relative to the sleeve is intended to control the magnitude of the breaking force to be applied. This method has the disadvantage that the strand must be spread apart for severing the central wire and that the breaking force can be predetermined only generally and, thus, in an unsatisfactory manner.

Methods for the subsequent removal of the free steel length of a tension member after the anchor is no longer required, are primarily based on the reduction of the strength or even the severing of the tension member under the influence of heat. For example, it is known from FR 22 74 740 to produce the energy required for this purpose by a chemically exothermic reaction, for example, by igniting an aluminothermic mixture.

In accordance with CH 681 835 A5, the heat supply is effected through induction by means of a coil. In that case, the tension member is provided with a coil prior to being mounted in the bore hole, wherein the coil surrounds the tension member at the predetermined breaking point. When the free steel length of the tension member is to be removed after use of the anchor, an electric current is applied to the coil. Heat is produced by induction at the location of the coil, so that the strength of the tension member is reduced to such an extent that the tension member breaks at this point when the working load is applied.

The disadvantage of this method is primarily due to the fact that it is necessary to introduce the device required for severing the tension member into the bore hole. This may require an increased diameter of the bore hole over the entire length of the bore hole. In addition, the device may be damaged when the anchor is mounted or the device may become inoperative during the use of the anchor as a result of external influences, such as, moisture, corrosion, pressure, etc., so that a subsequent reliable reduction of the strength of the tension member at the predetermined location is not possible. In addition, these devices can only be used once.

SUMMARY OF THE INVENTION

Therefore, it is the primary object of the present invention to provide a method of the above-described type in which an intended breaking point is produced at a predetermined location of a steel tension member, while avoiding the disadvantages described above in a simple and reliable manner.

In accordance with the present invention, prior to mounting the steel tension member, the steel tension member is subjected at the intended breaking point to a controlled heating to a temperature at which the strain-hardening or the thermodynamic imbalance are at least partially eliminated.

The tension members of soil anchors are usually composed of steel wire strands, i.e., of strain-hardened steels. In the strain-hardening of steels, the influence of external forces causes a plastic deformation below the recrystallization temperature of the steel, wherein the metal crystals slide on lattice planes. The resulting lattice imperfections are called dislocations.

This behavior is utilized in the manufacture of wires and rods when they are pulled through a drawing die and/or stretched at room temperature. The resulting reduction of the cross-sectional area of the wire or the rod produces, due to the increase of the dislocation density, an increase of the tensile strength and yield point. The metal is then in a constrained condition. By the supply of heat, this constrained condition is eliminated partially or completely depending on the temperature; a crystal regeneration occurs and, consequently, the yield point and the strength are reduced, while the ductility is simultaneously increased.

In accordance with the present invention, the above-described physical law is utilized by subjecting the respective tension member at the predetermined location to a controlled heating over a limited length. This makes it possible to produce a predetermined breaking point already prior to mounting the tension member without reducing the cross-sectional area of the tension member, wherein the tension member reliably breaks at this predetermined breaking point when a tensile force exceeding the working load is applied, when the original breaking load is applied or when a load is applied which is between the yield point and the breaking load. By the selection and control of the temperature of the heat treatment, the breaking force can be adjusted very precisely up to strength values of an untreated steel.

Particularly suitable for the heat treatment appears to be the method of electrical induction. In that method, the tension member is inserted into a coil and the coil is heated in the manner of a short-circuited winding of a transformer when a suitable middle-frequency to high-frequency current is introduced into the coil. A very sensitive control of the heating of the steel in the treated area is possible because of the fact that the cross-sectional size and the geometry of the coil as well as the frequency, voltage and magnitude of the current as well as the heating duration can be adapted within narrow and easily controllable limits to the cross-sectional size of the tension member.

The heat treatment can also be carried out by means of a flame, by means of a hot gas jet, by immersion in a hot liquid or by carrying out an exothermic chemical reaction.

In accordance with the present invention, the breaking force can be exactly adjusted between the original breaking load and the yield point, depending on the respective requirements. This makes it possible to fully utilize the soil anchor in the condition of operation because a failure of the anchor is indicated by a certain minimum deformation.

Because of the thermal treatment of the tension member prior to mounting, it is not necessary to mount the anchor together with any devices which would be required for a subsequent weakening or severing of the tension member.

Since the present invention utilizes relationships based on the crystal structure of metals, the present invention is not limited to the sole use in strain-hardened steel. Rather, the present invention has the advantage that it can be used in a wide variety of anchor types, steel grades and steel types. It is only required that the steels are not in the state of thermodynamic equilibrium. Among these steels are strain-hardened steels, but also steels which have been converted into the bainite stage and the martensite stage or beyond the martensite stage.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
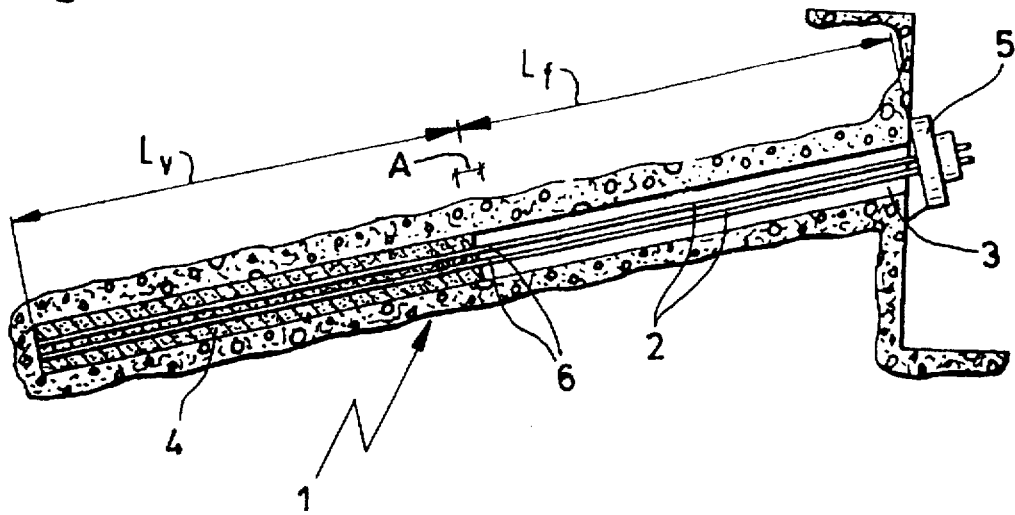
FIG. 1 is a longitudinal sectional view of a soil anchor.

FIG. 1 of the drawing is a longitudinal sectional view of a permanent soil anchor 1 which is composed of a steel tension member 2, for example, a bundle of steel wire strands. The steel tension member 2 is inserted into a bore hole 3. A pressing body 4 is produced in the lower portion of the bore hole 3 by pressing in hardening material, for example, cement mortar.

The tension member 2 is anchored in the pressing body 4 over a portion of its total length, the so called anchoring length $L_v$. Over the remaining portion of its total length, the so called free steel length $L_f$, the tension member is freely extendable. At the open end of the bore hole 3, the tension member 2 is anchored by means of an anchoring system 5, for example, for securing an excavation wall.

A portion A of the tension member 2, which has been subjected to a thermal treatment prior to mounting for producing a predetermined breaking point 6, is located in the area of the transition between the anchoring length $L_v$ and the free steel length $L_f$. Induction has been found to be an advantageous method of carrying out the thermal treatment of the tension member 2 because induction sufficiently uniformly heats the steel over the entire cross section thereof. For producing the induction prior to mounting the anchor in the bore hole, a coil is used whose windings surround the tension member 2 over a length of approximately 10 cm. Heat is produced in the steel tension member 2 by admitting electrical energy to the coil at a frequency of 100–150 kHz and a duration of 10 seconds to 2 minutes. In this manner, the temperature in the steel can be very precisely controlled.

Figure 2:
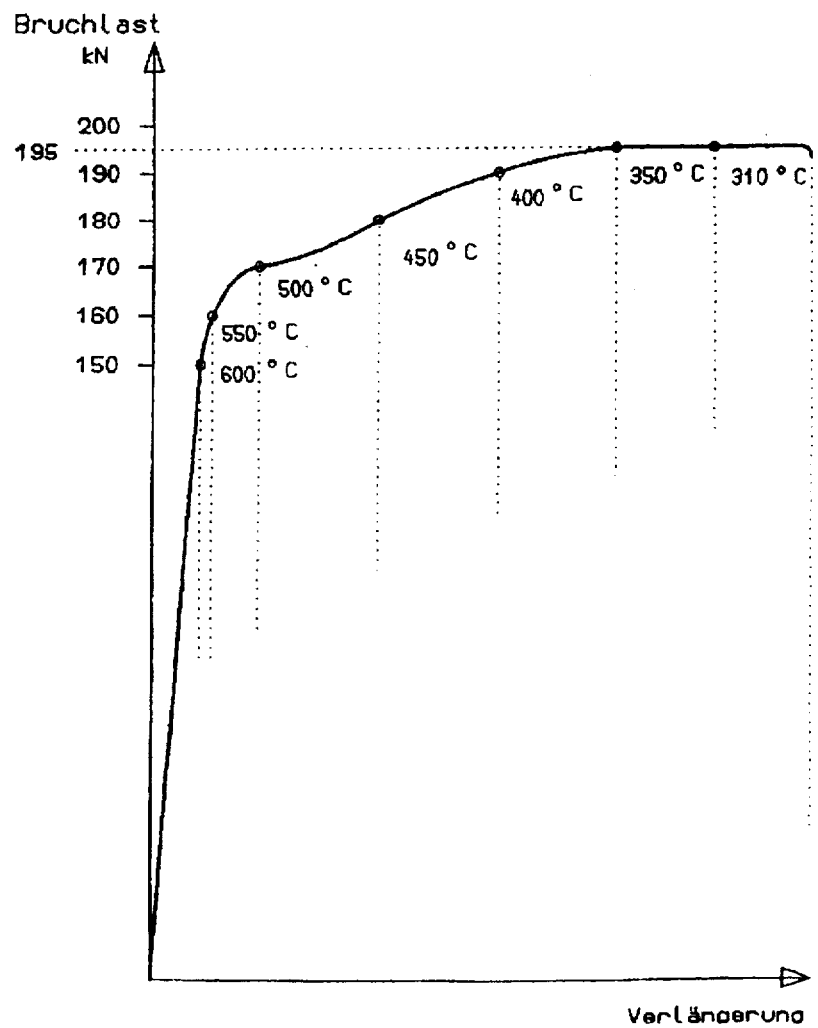
FIG. 2 is a force/elongation diagram of the tension member according to the present invention.

The force/elongation diagram according to FIG. 2 is the result of several test series conducted on seven-wire tension wire strands 0.5" of strain-hardened steel St 1640/1770. The individual strands were locally heated by means of an induction coil and were subjected to load after cooling up to rupture. It has been found that the strand ruptured without reduction of the carrying load in the area of inductive heating up to a certain temperature and that the rupture occurs at a correspondingly lower load and after a smaller elongation of the tension member only in dependence on the achieved higher temperature.

It has also been found that, up to a heating temperature of approximately 350° C., the tension member 2 still achieves the full carrying power of the anchor 1. The rupture occurs as a result of the fact that the tension member 2 has an increased ductility at the thermally treated location occurring as a result of the crystal regeneration produced by the thermal treatment, so that the constriction responsible for starting the rupture is localized in this location. Since the thermally treated portion A of the tension member is short in relation of the total length of the tension member, the different elongation behavior produced by the treatment according to the present invention at this location is insignificant with respect of the total length of the tension member.

While the breaking load remains practically uniform up to a temperature of 350° C., the breaking load steadily decreases at temperatures above 350° C. In practice, this means that the temperature range of 350° C. to 500° C., possibly up to 550° C., is of significance because in this range a failure of the anchor 1 when the breaking load is exceeded occurs only when the original yield point is exceeded. Accordingly, the rupture is always indicated by a plastic elongation of the anchor 1.

The invention is not limited by the embodiments described above which are presented as examples only but can be modified in various ways within the scope of protection defined by the appended patent claims.

We claim:

1. A method of producing a predetermined breaking point at a predetermined location of a tension member of a soil anchor composed of a steel in the strain-hardened state, for enabling removal of a free steel length after use of the soil anchor by applying a tensile force which exceeds a working load, the method comprising, prior to mounting of the tension member, subjecting the tension member at the predetermined location to controlled heating to a temperature at which the strain-hardened state is at least partially cancelled.

2. The method according to claim 1, comprising heating the tension member to a temperature of between 200° and 800° C.

3. The method according to claim 2, comprising heating the tension member to a temperature of between 200° and 600° C.

4. The method according to claim 1, comprising carrying out heating by induction.

5. The method according to claim 4, comprising producing induction by at least one coil surrounding the tension member.

6. The method according to claim 1, comprising heating by means of a flame.

7. The method according to claim 1, comprising heating by means of a hot gas jet.

8. The method according to claim 1, comprising heating by immersion in a hot liquid.

9. The method according to claim 1, comprising heating by carrying out an exothermic chemical reaction.

10. A method of producing a predetermined breaking point at a predetermined location of a tension member of a soil anchor composed of a steel in the state of not being in a thermodynamic equilibrium, for enabling removal of a free steel length after use of the soil anchor by applying a tensile force which exceeds a working load, the method comprising, prior to mounting of the tension member, subjecting the tension member at the predetermined location to controlled heating to a temperature at which the state of not being in a thermodynamic equilibrium is at least partially cancelled.

11. The method according to claim 10, comprising heating the tension member to a temperature of between 200° and 800° C.

12. The method according to claim 10, comprising heating the tension member to a temperature of between 600° and 800° C.

13. The method according to claim 10, comprising carrying out heating by induction.

14. The method according to claim 10, comprising producing induction by at least one coil surrounding the tension member.

15. The method according to claim 10, comprising heating by means of a flame.

16. The method according to claim 10, comprising heating by means of a hot gas jet.

17. The method according to claim 10, comprising heating by immersion in a hot liquid.

18. The method according to claim 10, comprising heating by carrying out an exothermic chemical reaction.

19. A tension member for a soil anchor of a steel in a strain-hardened state or a state of being not in a thermodynamic equilibrium, the tension member comprising a predetermined breaking point for enabling removal of a free steel length of the tension member after use by applying a tensile force exceeding a working load, the predetermined breaking point obtained by heating the tension member at a predetermined location in a controlled manner to a temperature at which the state of strain-hardening or the state of being not in a thermodynamic equilibrium is at least partially cancelled, wherein the predetermined breaking point has a breaking load which is equal to or smaller than the breaking load of the untreated tension member, but greater than the yield point of the untreated tension member.

* * * * *